Jan. 19, 1971   A. J. WESTBROOK ET AL   3,555,613

ROTATIONAL MOULDING APPARATUS

Filed July 22, 1968

Inventors
AUBREY JOSEPH WESTBROOK
IAN DAVID MACKNIGHT THOMSEN
By Michael S. Striker
Attorney

United States Patent Office 3,555,613
Patented Jan. 19, 1971

---

3,555,613
ROTATIONAL MOULDING APPARATUS
Aubrey Joseph Westbrook, Ladyacre, Kilwinning, and Ian David MacKnight Thomson, Irvine, Scotland, assignors to Plastic Rotational Mouldings Limited, London, England, a British company
Filed July 22, 1968, Ser. No. 746,354
Claims priority, application Great Britain, July 26, 1967, 34,311/67
Int. Cl. B29c 1/16, 5/04
U.S. Cl. 18—26                                4 Claims

ABSTRACT OF THE DISCLOSURE

This invention relates to a rotational moulding apparatus comprising a heating station defined by a roof and two side walls, a track extending between the side walls from a position at least to one side of the station, a bogie movable along the track, from a heating position between the side walls to a second position outside the heating station, mould rotating means for supporting a hollow mould over the bogie and rotating the same about two axes, means for supplying a flowable heating medium to the heating station and an upstanding panel on the bogie disposed so that in the heating position thereof it defines part of the boundary walls of the heating station.

---

This invention relates to moulding apparatus of the kind in which a heated hollow mould containing a hardenable liquid composition is rotated about two axes (normally mutually perpendicular axes) until the composition hardens as a coating of substantially uniform thickness on the internal surface of the mould. Throughout this specification, such moulding apparatus will be referred to as "rotational moulding apparatus."

Rotational moulding apparatus normally comprises a loading/unloading station (where hollow moulds are attached to the mould rotating means prior to processing and are removed from the mould rotating means after processing), a heating station (where the contents of the mould are heated as it is rotated) and a cooling station (where the mould is cooled, normally with water sprays and usually while rotation is continued). In some forms of rotational moulding apparatus, the loading and unloading station and the cooling station may be combined. It is necessary to physically isolate the heating station from the cooling station and in prior art apparatus it has been usual to employ movable doors (slidable or hinged) to close these stations after the mould has been placed therein.

With a move towards the use of solidifiable liquid sprays in the heating station, problems have arisen due to a buildup of solidified material on the doors during the spraying operation which has prevented (or at least impeded) smooth movement of the doors when the mould is to be moved to the cooling station. Further the use of such moving doors means that before commencing the heating cycle, not only must the mould be correctly positioned in the heating station, but the doors must be closed as a separate operation. Where fully automatic control of the rotational moulding apparatus is desired, this separate operation complicates the control system and increases the chances of malfunctioninng of the automatic control.

One object of the present invention is to provide an improved rotational moulding apparatus which obviates the use of conventional moving doors and in its preferred embodiment simplifies the construction and operation of the apparatus.

According to the present invention, a rotational moulding apparatus comprises a heating station defined by a roof and two side walls, a track extending between the side walls from a position at least to one side of the station, a bogie movable along the track, from a heating position between the side walls to a second position outside the heating station, mould rotating means for supporting a hollow mould over the bogie and rotating the same about two axes, means for supplying a flowable heating medium to the heating station and an upstanding panel on the bogie disposed so that in the heating position thereof it defines part of the boundary walls of the heating station.

Preferably, there are two spaced-apart upstanding panels on the bogie disposed so that, when the bogie is in its heating position, the panels define opposite end walls of the heating station.

We prefer to provide flaps on the side walls to abut with the edges of the panel or panels and in one embodiment of the invention these flaps may be pneumaitcally-controlled flaps preheated to a temperature corresponding to that of the flowable heating medium employed in the station. Alternatively, the flaps may be of thin resilient metal sheet such that they rapidly acquire the temperature of the flowable heating medium. In this way preheating of the flaps can be dispensed with.

Drive means for the bogie and for the mould rotating means may be mounted on the bogie preferably on that side of the panel (or one of the panels) which ensures they are protected from the heating medium by the panel when the bogie is in the heating station.

One embodiment of rotational moulding apparatus in accordance with the invention will now be described by way of example, with reference to the accompanying drawing, in which.

Figure 1:
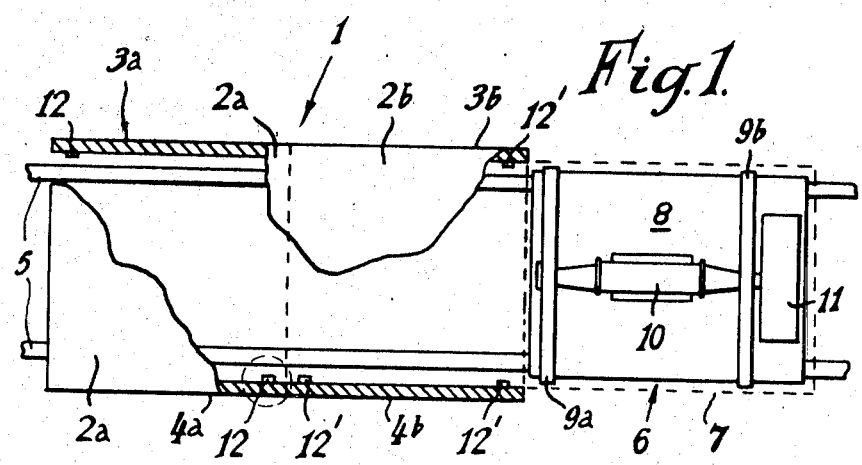
FIG. 1 is a schematic plan of the apparatus.

Referring to the drawing, the rotational moulding apparatus comprises a tunnel-shaped sturcture 1, having roof portions 2a and 2b and side wall portions 3a, 3b and 4a, 4b. The structure 1 defines a heating station (subscript *a*) and a cooling station (subscript *b*) and surmounts a track 5 extending between the side walls 3 and 4.

A bogie 6 moves along the track 5 from a loading/unloading position (shown by the dotted line 7) through the cooling station and into the heating station. The bogie 6 comprises a platform 8, front and rear upstanding panels 9a, 9b and a mould-support arm 10, rotatable by drive means 11 in two mutually perpendicular directions.

After loading one or more hollow moulds on the support arm 10 (each containing—for example—a thermoplastic powder), the bogie 6 is moved through the structure 1 to the end position defining the heating station. In this position, the panels 9a and 9b abut edge seals 12 so that the bogie 6, with the fixed structure 1, forms a closed heating chamber into which a molten salt may be sprayed from jets located in the roof portion 2a. The molten salt rapidly heats the mould as it is rotated and then drains through a hole in the platform 8 to a tank (not shown) of molten salt disposed below the track 5.

When the heating cycle is completed the bogie 6 is moved back to the cooling station, the panels 9a and 9b then abutting edge seals 12' to define a closed cooling chamber into which water may be sprayed from jets located in the roof portion 2b.

Where a molten salt is used as the heating medium, there is a possibiilty of a fillet of solidified salt forming between the edge seals 12 and the respective edges of the panels 9a and 9b, and to prevent such salt buildup, it is desirable to heat the edge seals to a temperature at least above the melting point of the salt. One convenient way of heating the edge seals 12 is to form them in the manner shown in FIG. 2.

Figure 2:
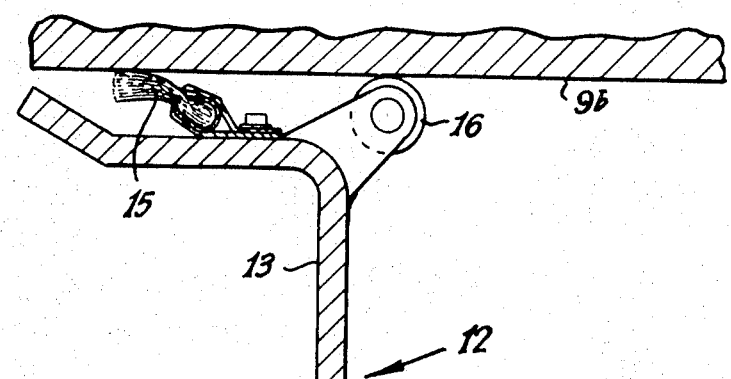
FIG. 2 is a horizontal section, on an enlarged scale, of the sealing flap shown in the dotted circle in the apparatus of FIG. 1.
Figure 2:
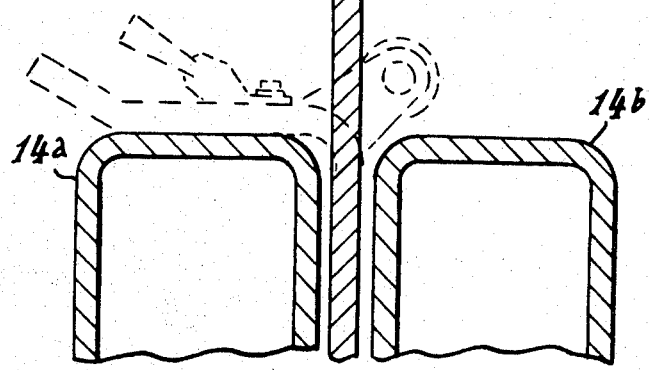

Referring to FIG. 2, the edge seal is seen to comprise a flap 13 disposed between two hollow channel members 14a and 14b through which molten salt is continually pumped. The flap 13 is connected with a pneumatic ram (not shown) to extend the same towards an edge of the panel 9b. Adjacent the inner edge of the flap 13 is an elongated brush 15 formed of phosphor-bronze fibres. Behind the brush 15 are a plurality of rollers 16 (only one shown in FIG. 2) to prevent the flap 13 being pressed too far against the adjacent panel 9b and thus to prevent damage to the delicate brush 15.

From a consideration of FIG. 2, it will be appreciated that the method of sealing the side walls 3a, 4a to the panels 9a, 9b, allows the seal to accommodate the expansion of the bogie 6. Because of the wide surface of the panel against which the brush 15 bears, lengthwise expansion of the bogie merely alters the sealing positions of the brushes 15 on the edges of the panels and widthwise expansion of the bogie merely forces the flaps 13 closer towards the adjacent channel section members 14a, 14b against the urging of the pneumatic rams.

The embodiment described with reference to the drawing is merely one example of a rotational moulding apparatus in accordance with the invention and many modifications can be made thereto without departing from the invention as hereinbefore defined. Thus, for example the preheated retractable flaps may be replaced by thin sheets of flexible stainless steel mounted on the side walls 3 and 4 or on the bogie 6. Further, the panel 9a may be dispensed with if the structure 1 is closed at the end adjacent to the heating station, a retractable partition mounted in the structure (not shown) being employed to prevent cooling water entering the heating station when the bogie is positioned in the cooling station.

What is claimed is:
1. Rotational moulding apparatus comprising a heating station defined by a roof and two side walls, a track extending between the side walls from a position at least to one side of the station, a bogie movable along the track, from a heating position between the side walls to a second position outside the heating station, mould rotating means for supporting a hollow mould over the bogie and rotating the same about two axes, means for supplying a flowable heating medium to the heating station and an upstanding panel on the bogie disposed so that in the heating position thereof it defines part of the boundary walls of the heating station.

2. Rotational moulding apparatus as claimed in claim 1, in which there are two spaced-apart upstanding panels on the bogie disposed so that, when the bogie is in its heating position, the panels define opposite end walls of the heating station.

3. Rotational moulding apparatus as claimed in claim 1, in which sealing means in form of flaps are provided on the side walls to engage with the edges of the panel when the bogie is disposed in the heating position.

4. Rotational moulding apparatus as claimed in claim 3, in which the flaps are of flexible metal sheet.

References Cited
UNITED STATES PATENTS

| | | | |
|---|---|---|---|
| 1,086,276 | 2/1914 | Cowles | 25—142B |
| 1,560,618 | 10/1925 | Stevens | 25—142C |
| 2,213,396 | 9/1940 | Hyde et al. | 263—28 |
| 3,237,247 | 3/1966 | Eggert et al. | 18—26 |
| 3,337,662 | 8/1967 | Spencer | 18—27RX |

ANDREW R. JUHASZ, Primary Examiner

U.S. Cl. X.R.

25—142